United States Patent
Aljabri et al.

(10) Patent No.: US 11,760,912 B2
(45) Date of Patent: Sep. 19, 2023

(54) FLUORESCENT BARCODED QUANTUM DOTS FOR DRILLING DEPTH CORRELATION

(71) Applicant: SAUDI ARABIAN OIL COMPANY, Dhahran (SA)

(72) Inventors: Nouf M. Aljabri, Dhahran (SA); Vera Solovyeva, Moscow (RU); Alberto F. Marsala, Venice (IT)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/451,407

(22) Filed: Oct. 19, 2021

(65) Prior Publication Data

US 2023/0120528 A1     Apr. 20, 2023

(51) Int. Cl.
  *E21B 47/11*     (2012.01)
  *C09K 8/035*    (2006.01)
  *C09K 11/02*    (2006.01)
  *C09K 11/88*    (2006.01)
  *E21B 47/04*    (2012.01)

(52) U.S. Cl.
  CPC ............ *C09K 8/035* (2013.01); *C09K 11/025* (2013.01); *C09K 11/883* (2013.01); *E21B 47/04* (2013.01); *E21B 47/11* (2020.05)

(58) Field of Classification Search
  None
  See application file for complete search history.

(56) References Cited

U.S. PATENT DOCUMENTS

| | | | |
|---|---|---|---|
| 9,803,135 B2 | 10/2017 | Barron et al. | |
| 2011/0214488 A1 | 9/2011 | Rose et al. | |
| 2013/0109597 A1 | 5/2013 | Sarkar et al. | |
| 2018/0283173 A1 | 10/2018 | Lecolier et al. | |
| 2020/0131894 A1 | 4/2020 | Murugesan et al. | |

FOREIGN PATENT DOCUMENTS

WO     2012154332 A2    11/2012

OTHER PUBLICATIONS

Tomczak et al.; "Polymer-coated quantum dots"; Nanoscale; vol. 5, 2013, p. 12018-12032. (Year: 2013).*

(Continued)

*Primary Examiner* — Andrew Sue-Ako
(74) *Attorney, Agent, or Firm* — Osha Bergman Watanabe & Burton LLP (57) ABSTRACT

A composition of matter includes a core-shell quantum dot particle having an inorganic core and an organic shell and drilling fluid. A method includes introducing a core-shell quantum dot particle having an inorganic core and a polymer shell into a drilling fluid, circulating the drilling fluid through a well during a drilling operation that creates formation cuttings such that the core-shell quantum dot particle interacts with the formation cuttings, creating tagged cuttings, collecting returned cuttings from the circulating drilling fluid at a surface of the well, detecting the presence of the core-shell quantum dot particle on the returned cuttings to identify the tagged cuttings, and correlating the tagged cuttings with a drill depth in the well at a time during the drilling operation.

13 Claims, 2 Drawing Sheets

(56) References Cited

OTHER PUBLICATIONS

Kini et al.; "Salt- and temperature-stable quantum dot nanoparticles for porous media flow", Colloids and Surfaces A: Physicochemical and Engineering Aspects; vol. 443; Feb. 20, 2014; pp. 492-500 (9 pages).
Turkenburg et al.; "Use of Modified Nanoparticles in Oil and Gas Reservoir Management", SPE 157120; Society of Petroleum Engineers; Jun. 12, 2012; pp. 1-5 (5 pages).
International Search Report and Written Opinion Issued in Corresponding PCT Applicaiton No. PCT/US2022/047547, dated Mar. 1, 2023, 8 pages.

* cited by examiner

FLUORESCENT BARCODED QUANTUM DOTS FOR DRILLING DEPTH CORRELATION

BACKGROUND

Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole. Drill cuttings, also referred to as "rock cuttings" or "formation cuttings" are rock fragments generated by the drill bit as the drill bit advances along the borehole. Mud logging is the creation of a well log of a borehole by examining the rock cuttings brought to the surface by the circulating drilling mud.

A taggant or "tag" is a chemical or physical marker added to materials to allow various forms of testing of the marked materials. The taggant can be detected using a taggant detector. A physical taggant can take many different forms but is typically microscopic in size, added to the materials at low levels, and simple to detect. The taggant may be encoded based on a specific characteristic (e.g., optical, chemical, electrical, or mechanical characteristic) to act as a virtual "fingerprint." Examples of encoded taggant include microscopic, metallic tags, e.g., between 0.3 and 1.0 millimeters, that have unique multi-digit alphanumeric identification codes. For example, the identification code may be etched into an optically variable (holographic) substrate of the tag. The tags may be suspended in a UV sensitive clear adhesive which is either brushed or sprayed onto any item for authentication or other security purposes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition of matter comprising a core-shell quantum dot particle having an inorganic core and an organic shell, and drilling fluid.

In another aspect, embodiments disclosed herein relate to a method that includes introducing a core-shell quantum dot particle having an inorganic core and a polymer shell into a drilling fluid, circulating the drilling fluid through a well during a drilling operation that creates formation cuttings such that the core-shell quantum dot particle interacts with the formation cuttings, creating tagged cuttings, collecting returned cuttings from the circulating drilling fluid at a surface of the well, detecting the presence of the core-shell quantum dot particle on the returned cuttings to identify the tagged cuttings, and correlating the tagged cuttings with a drill depth in the well at a time during the drilling operation.

Other aspects and advantages of the claimed subject matter will be apparent from the following description and the appended claims.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein generally relate to a composition that includes a core-shell quantum dot particle and drilling fluid. The core-shell quantum dots described herein exhibit fluorescent properties making suitable for detection using common analytical techniques. Methods of using the composition to determine drill depth of formation cuttings are also described. Core-shell quantum dot particles in accordance with one or more embodiments may be injected into the drilling fluid during drilling operations and travel downhole. Disclosed core-shell quantum dot particles may interact with the formation downhole and in some instances, attach to drill cuttings produced during the drilling process. As such, drill cuttings may be "tagged" with the fluorescent quantum dot particles described herein. Fluorescent quantum dot particles tags having different wavelengths of fluorescent emissions, i.e., tags emitting different colors, may be controllably introduced at different drill depths. When tagged cuttings are returned to the surface via circulating drilling fluid, they can be identified based upon the fluorescence emission from the tag. This fluorescence may be correlated to an associated drilling depth, and the cuttings may be identified by the depth at which they originated. Thus, disclosed compositions may be useful for determining the drilling depth of various drill cuttings.

Drilling System

Figure 1:
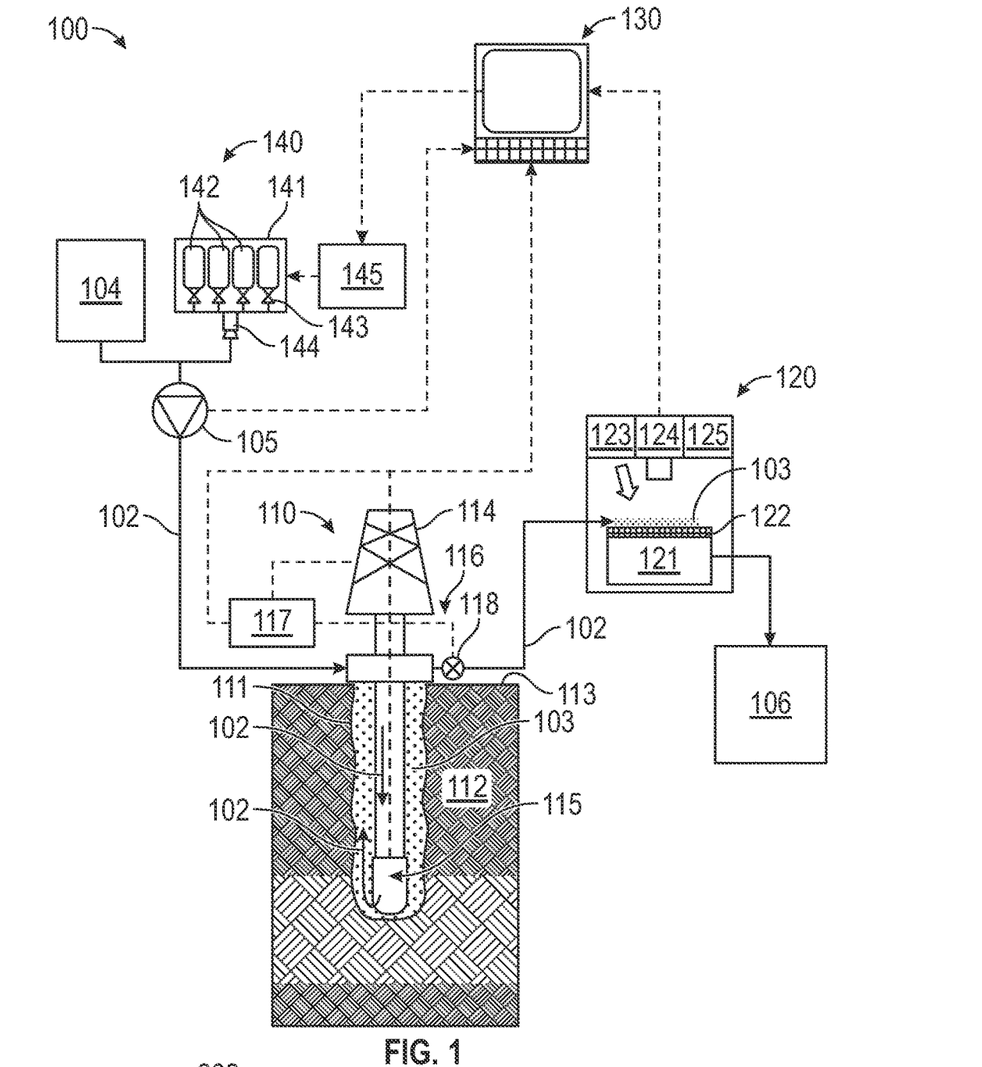
FIG. 1 shows a system according to embodiments of the present disclosure.

FIG. 1 shows a schematic diagram of a system 100 in which the compositions and methods disclosed herein may be used in accordance with one or more embodiments of the present disclosure. In one or more embodiments, one or more of the modules and/or elements shown in FIG. 1 may be omitted, repeated, and/or substituted. As shown in FIG. 1, the system 100 may include a well system 110, a cuttings return and detection system 120, an analysis and control system 130, and a drilling fluid tagging system 140, which may be directly and indirectly in communication with each other.

The well system 110 may include a well 111 being drilled through a subsurface formation ("formation") 112 to a hydrocarbon-bearing layer of the formation beneath the earth's surface ("surface") 113. The formation 112 may include different layers of rock having varying characteristics, such as varying degrees of permeability, porosity, capillary pressure, and resistivity. In the case of the well system 110 being operated as a production well, the well system 110 may facilitate the extraction of hydrocarbons (or "production") from the hydrocarbon-bearing layer of the formation 112. As the well 111 is drilled through the formation 112, portions of the well may be cased with a casing (extending from the surface of the well) or a liner (extending downhole from an end of a previously installed casing or liner) to line the wellbore wall. The terms "open hole," "borehole," and "wellbore" may be used interchangeably and refer to an uncased portion of a well.

In some embodiments, the well system 110 may include a rig 114 positioned above an opening to the well 111, a well sub-surface system 115, a well surface system 116, and a well control system 117. The well control system 117 may control various operations of the well system 110, such as well production operations, well drilling operations, well completion operations, well maintenance operations, and reservoir monitoring, assessment and development operations. In some embodiments, the well control system 117 may include a computer system that is the same as or similar to that of the analysis and control system 130, described below in more detail.

The rig 114 may hold equipment used to drill a borehole to form the well 111. Major components of the rig 114 may include drilling fluid tanks, drilling fluid pumps (e.g., rig mixing pumps), a derrick or mast, drawworks, a rotary table or top drive, drill string, power generation equipment and auxiliary equipment.

The well 111 may include a borehole that extends from the surface 113 into the formation 112. An upper end of the well 111, terminating at the surface 113, may be referred to as the "up-hole" end of the well 111, and a lower end of the well, terminating in the formation 112, may be referred to as the "downhole" end of the well 111.

In some embodiments, during operation of the well system 110, the well control system 117 may collect and record well data (e.g., from monitoring devices (e.g., logging tools) lowered into the well during monitoring operations (e.g., during in situ logging operations, or from drilling operations) for the well system 110. For example, during drilling operations of the well 111, the well data may include mud properties, flow rates, drill volume and penetration rates, formation characteristics, etc. In some embodiments, the well data may be recorded in real-time, and are available for review or use within seconds, minutes or hours of the condition being sensed (e.g., the measurements are available within 1 hour of the condition being sensed). In such embodiments, the well data may be referred to as "real-time" well data. Real-time well data may enable an operator of the well 111 to assess a relatively current state of the well system 110, and make real-time decisions regarding development of the well system 110 and the reservoir, such as on-demand adjustments in drilling fluid and regulation of production flow from the well.

In some embodiments, the well surface system 116 may include a wellhead installed at the "up-hole" end of the well, at or near where the well terminates at the surface 113, where the wellhead may include a rigid structure for supporting (or "hanging") casing and production tubing extending into the well 111. Drilling fluid directed from the well to the surface may flow through the wellhead, after exiting the well 111 and the well sub-surface system 115, including, for example, casing, production tubing, a drill string, and a bottom hole assembly (including a drill bit). Such fluid may carry the disclosed quantum dots downhole, as will be explained in greater detail below. In some embodiments, the well surface system 116 may include flow regulating devices that are operable to control the flow of substances into and out of the well 111. For example, the well surface system 116 may include one or more valves 118 that are operable to control the flow of fluid from the well 111. For example, a valve 118 may be fully opened to enable unrestricted flow of returning drilling from the well 111, the valve 118 may be partially opened to partially restrict (or "throttle") the flow of fluid from the well 111, and the valve 118 may be fully closed to fully restrict (or "block") the flow of fluid from the well 111, and through the well surface system 116.

In some embodiments, the well surface system 116 may include surface sensors for sensing characteristics of fluids passing through or otherwise located in the well surface system 116, such as pressure, temperature and flow rate of fluid flowing through the wellhead, or other conduits of the well surface system 116, after exiting the well 111. Surface sensors may also include sensors for sensing characteristics of the rig 114 and drilling equipment, such as bit depth, hole depth, hook load, rotary speed, weight on bit, etc.

In a drilling operation, drilling fluid 102 may be pumped from a drilling fluid source 104, which may be, for example, supplied through trucks or tanks, where the drilling fluid source 104 may include a premixed drilling fluid or components provided separately that are mixed on site. In some embodiments, the drilling fluid source 104 may include used drilling fluid from a mud pit 106, which includes drilling fluid that was circulated through the well, returned to the surface and cleaned. In accordance with one or more embodiments of the present disclosure, quantum-dot particles may be pumped downhole with the drilling fluid 102 and circulated through the well 111 to tag cuttings as they are formed from drilling.

Fluorescent quantum dot particles may be supplied from a tag injection assembly 141 in the tagging system 140. The tag injection assembly 141 may include a plurality of tag chambers 142, each tag chamber 142 holding a different tag and having a valve 143 positioned at a chamber outlet. A metering pump 144 may be in fluid communication with the chamber outlets of the tag chambers 142, such that when tags are released from a tag chamber 142 through the associated valve 143, the tags may be metered into the drilling fluid 102. For example, as drilling fluid 102 is pumped from the drilling fluid source 104 to the well 111, a selected tag may be released from a tag chamber 142 and metered at a selected rate through the metering pump 144 to mix with and flow with the drilling fluid 102 into the well 111.

The valves 143 and metering pump 144 may be operated and controlled using a controller 145. The controller 145 may be integrated with the tag injection assembly 141 or may be remote from the tag injection assembly 141. The controller 145 may send commands to the valves 143 (e.g., to open or close the valve) and the metering pump 144 (e.g., to control the speed at which the tags are metered through the pump). The controller 145 may also receive signals from the valves 143 and metering pump, for example, signals relaying status of operation. The controller 145 may send commands to implement one or more jobs designed by the analysis and control system 130. For example, the analysis and control system 130 may determine an optimized tag release operation and send instructions to the controller 145 for implementing the optimized tag release operation. The controller 145 may then send commands to one or more valves 143 and the metering pump 144 to release tags from one or more tag chambers 142 at a given speed and on a schedule according to the optimized tag release operation.

One or more pumps 105 may be used to pump the mixed tags and drilling fluid into the well 111 as the well is drilled. The drilling fluid 102 and tags may be pumped through a drill string extending through the well and out of a bottom hole assembly (e.g., through a drill bit) at an end of the drill string. When the tags are ejected out of the bottom of the drill string with the drilling fluid, the tags may attach to the formation being drilled. In one or more embodiments, the drill bit may press the tags into the formation, which may cause the tags to stick to or stain parts of the formation that then become cuttings. In some embodiments, hydraulic circulation may be the main driving force for attachment of the tags to the formation, however, the detailed interaction mechanism between the tags and formation depends on the type of tag used and may vary (e.g., chemical interaction, physical attachment, and/or electrostatic interactions). As the formation is drilled, cuttings 103 from the formation having the attached tags may be sent to the surface of the well and analyzed in the cuttings return and detection system 120.

When the drilling fluid 102 and tagged cuttings 103 are pumped to the surface of the well 111 during a drilling operation, the returned drilling fluid may be directed via one or more conduits (e.g., piping) to one or more separators 121 (sometimes referred to in the industry as shakers) in the cuttings return and detection system 120. In some embodiments, returned cuttings may automatically be directed to one or more separators 121 based on commands received from the well control system 117. A separator 121 may include, for example, one or more screens 122 arranged in the flow path of the returned drilling fluid to catch and separate cuttings 103 from the drilling fluid. For example, a separator 121 may have a screen 122 positioned laterally at an upper end of the separator 121, where returned drilling fluid may be flowed over the screen 122 after returning from the well 111. As the returned drilling fluid 102 is flowed over the screen 122, cuttings 103 in the returned drilling fluid 102 may be caught by the screen 122, while the drilling fluid 102 flows through the screen openings. In such manner, cuttings 103 brought up from drilling the well 111 may be captured and held by a screen 122 in a separator 121. In some embodiments, more than one screen and/or more than one separator may be used to separate cuttings from returned drilling fluid. In some embodiments, one or more conveyors may convey screens and/or cuttings along a path, e.g., to move cuttings to a different location for analysis.

A detection system 120 including one or more UV light sources 123 and a detection apparatus may be used to detect the presence of tags on the drill cuttings. In the embodiment shown in FIG. 1, the detection apparatus is exemplified by a camera 124. In some embodiments, the UV light source 123 may be provided around the separator 121 in a position to illuminate the cuttings 103 with UV light, and the camera 124 may be positioned above the separator 121 and positioned to take pictures of the cuttings 103 when they are illuminated by the UV light. For example, as shown in FIG. 1, a UV light source 123 and a camera 124 may be held a distance above the top screen 122 of a separator 121 and positioned to face the screen 122. The UV light source 123 and the camera 124 may be positioned adjacent or proximate to each other, such that when the UV light source 123 illuminates cuttings 103 with UV light, the camera 124 may be in a position to take images of the illuminated cuttings 103. In some embodiments, the camera 124, UV light source 123, and separator 121 may be integrated into one equipment unit. In some embodiments, one or more conveyors may be used to convey the captured cuttings 103 a distance from the separator 121 to a separate detection system having at least one UV light source and a camera. While the embodiment shown in FIG. 1 depicts a UV light source and a camera, any instrumentation suitable for detecting fluorescence may be used, such as a fluorometer or a UV-visible spectrometer. In one or more embodiments, drill cuttings may be analyzed off site using a mass spectrometer. In embodiments in which a mass spectrometer is used, the core-shell particles may be pyrolyzed such that the polymer shell of the core-shell particles degrades to generate a unique spectrum to be detected by the mass spectrometer.

Depending on the return fluid flow rate and amount of cuttings being returned in a drilling operation, separated and captured cuttings may be moved through the separator 121 relatively quickly to allow for a continuous separation operation. To aid in a continuous separation operation, the UV light source 123 may continuously direct UV light towards the collection of cuttings, thereby continuously illuminating the cuttings, and the camera 124 may be controlled to take images of the illuminated cuttings at a rate commensurate with the speed of cutting separation and removal. In some embodiments, the UV light source 123 may be controlled to operate in coordination with the camera 124, such that operation of the UV light source 123 is timed to illuminate the collection of cuttings immediately before and during taking an image of the cuttings with the camera 124, and where the coordinated operation of both the UV light source 123 and camera 124 may be at a rate commensurate with the speed of cutting separation and removal. The camera 124 may be controlled by a timer and/or using a software program to take images at a time when the UV light source is on. For example, a camera 124 may be controlled to take a picture at an interval (e.g., every 5 minutes, every 10 minutes, or at an interval that is tied to a flow rate of returning drilling fluid measured along a flow path between the well 111 and the separator 121), while the UV light source 123 may be controlled to continuously illuminate the separated cuttings or to illuminate the separated cuttings along the same picture taking interval as the camera 124.

In embodiments in which a camera is used as the detection apparatus, an image processing system 125 may be used to analyze images taken by the camera 124 and identify a percentage of tagged cuttings 103 (cuttings that are illuminated an identified color under the UV light) from the total captured cuttings 103 in the image. The image processing system 125 may be provided as part of the detection system 120, for example, where the camera 124 includes software instructions to perform image analysis of the pictures it takes to identify tagged cuttings 103.

The detection data, including an identified amount of at least one tag color, may then be sent to the analysis and control system 130, as discussed in more detail below. In some embodiments, the image processing system 125 may be provided as part of the analysis and control system 130, where a camera 124 may send images of captured cuttings 103 to the image processing system in the analysis and control system to be processed and identify tagged cuttings 103. An image processing system 125 may analyze images in real-time, as each image is taken. For example, in some embodiments, an image processing system 125 may analyze a first image taken by a camera 124 and identify a percentage of cuttings tagged with one or more tag colors before the camera 124 takes a second image.

Any available image processing software may be used to process images taken by the camera 124 and identify an amount of at least one tag color in each image. In some embodiments, image processing software may include instructions to divide an image into discrete uniformly sized units (e.g., pixels) and compare the color in each unit. A ratio may be calculated of the different colored units, which may be used to calculate a percentage of cuttings tagged with a selected tag color (which may be captured in the image while the cuttings are illuminated by the UV light) out of the total amount of cuttings detected in the image. The drilling depth at which the formation cuttings were generated may then be determined based on the colors identified in the collected images.

Core-Shell Quantum Dot Composition

As previously described, the present disclosure relates to a composition useful for determining the drilling depth of cuttings formed during a drilling process. Compositions in accordance with one or more embodiments of the present disclosure include a core-shell quantum dot particle. The core-shell quantum dot particle has an inorganic core and an organic shell.

Figure 2:
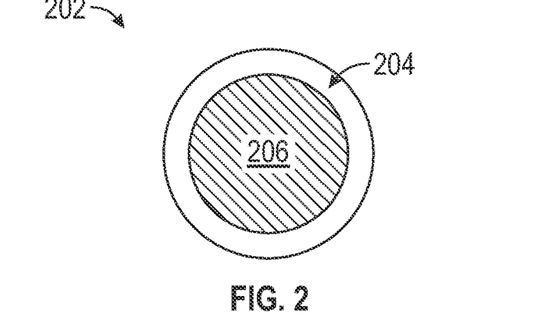
FIG. 2 shows a schematic depiction of a core/shell quantum dot in accordance with one or more embodiments.

A simplified depiction of a core/shell quantum dot particle in accordance with the present disclosure is shown in FIG. 2. The particle 202 has a shell 204 and a core 206. The shell is a coating on the outer surface of the core. The shell 204 essentially covers the entire surface of the core particle 206. The core 206 is comprised of an inorganic material that is a quantum dot. As used herein, a "quantum dot" is a semiconductor nanoparticle with unique optical properties that allow it to absorb and emit UV radiation at a specific wavelength. Due to these unique optical properties, a quantum dot may be readily identified by the color of light it absorbs or emits, i.e., the specific wavelength of light. The wavelength of light emitted by the quantum dot depends on the size of the quantum dot, meaning the size of the quantum dot may be tuned in order to change the wavelength of light that it emits. In one or more embodiments, the quantum dots disclosed herein may have an average particle size ranging from 2 to 15 nm (nanometers).

In accordance with one or more embodiments, the core-shell quantum dot particles exhibit fluorescence. Fluorescence refers to a form of luminescence that may emit light when ultraviolet light or other electromagnetic radiation is absorbed. For example, when ultraviolet light is absorbed by a fluorescent compound, the fluorescent compound may emit visible light, which may be referred to as fluorescent light. Suitable quantum dots are those that emit fluorescence at a known wavelength on the spectrum of visible light (i.e., from about 400 to about 700 nanometers) and are stable under formation conditions. As may be appreciated by those skilled in the art, quantum dots having different wavelengths of emission may be chosen to distinguish between different quantum dots.

The inorganic core of the core-shell quantum dot particle may be composed of any suitable material that fluoresces as previously described. In one or more embodiments, the core of the core/shell quantum dot is a cadmium-containing chalcogenide material. Examples of suitable cadmium-containing chalcogenides may include but are not limited to $Cd_xZn_{1-x}O$, CdSe, $Cd_xFe_{1-x}S$, and $Cd_xZn_{1-x}S$. In other embodiments, the inorganic core does not contain cadmium. In such embodiments, the inorganic core is selected from the group consisting of InP, $CuInS_2$, PbS, PbO, ZnO, ZnS, HgS, GaAs, GaP, AlGaAs, HgTe, InAs, and graphene. The inorganic core may be a heterostructure such as InP/ZnSeS/ZnS in some embodiments. In one or more embodiments, the inorganic core is a perovskite. In such embodiments, the perovskite is selected from the group consisting of $CsPbBr_3$, and $CH_3NH_3PbBr_3$.

In one or more embodiments, the inorganic core includes a dopant. The dopant may be included to tune the optical properties of the inorganic core. In particular embodiments, the dopant may be selected from the group consisting of $Mn^{2+}$, $Tm^{3+}$, $Er^{3+}$, $Tb^{3+}$, $Eu^{3+}$, $Ag^+$, and combinations thereof.

As noted previously, the core-shell quantum dot may have an organic shell. The shell may enhance the interaction between the core-shell quantum dot and the drill cuttings produced during the drilling process. For example, polymers that are known to adhere strongly to rock cuttings may be used to provide stronger interactions between the quantum dot particles and the cuttings. While the shell of the core-shell quantum dot may be an organic shell, the shell is not limited to organic compounds. In one or more embodiments, the shell may be an inorganic material such as silica.

In one or more embodiments the organic shell comprises an organic ligand. The organic ligand may be attached to the nanoparticle surface as a result of being present in the nanoparticle synthesis reaction. A layer the ligand molecules may be formed on the surface of the core particle serving as the shell. In one or more embodiments, the type of organic ligand is selected from the group consisting of thiols, phosphines and peptides. Examples of suitable organic ligands include, but are not limited to, tri-n-octyl phosphine oxide, 2-mercaptoethanol, 1-thioglycerol, thioglycolic acid, 2-mercaptoethylamine, L-cysteine, and 2-(dimethylamino)ethanethiol.

In one or more embodiments, the organic shell is a polymer. In one or more embodiments the type of polymer is selected from the group consisting of polythiols, poly(ethylene glycol), thiolated poly(ethylene glycol), peptides, multidentate phosphine polymers, poly(acrylamide)s, poly(amidoamine)s, poly(ethyleneimine)s, poly(N,N-dimethylaminoethyl methacrylate)s, amphiphilic di- and triblock-co-polymers (amphipols), poly(maleic acid) derivatives, poly(maleic anhydride-alt-1-tetradecene), and combinations thereof. In particular embodiments, the polymer is selected from the group consisting of poly ethyleneimine, polyacrylamide, poly chlorostyrene, poly bromostyrene, and poly methylstyrene.

The polymer forming the shell of the core/shell quantum dot may be derived from units of one or more monomers. In such embodiments, the monomer is selected from the group consisting of styrene, amino styrene, bromo styrene, chloro styrene, butylmethacrylate, t-butyoxystyrene, trifluoromethyl styrene, pentafluorostyrene, ethylene glycol dimethacrylate, triethyl orthosilicate, ethylene oxide, acrylic acid, methacrylic acid, ethylene, propylene, and combinations thereof.

Polymers disclosed herein may be selected to enhance the compatibility of the quantum dots with drilling fluid, to improve the stability of the quantum dots in harsh reservoir environments including high temperatures (e.g., over 100° C.) and elevated salinities (more than 56,000 ppm), and to improve the photoluminescence quantum yield of the quantum dots.

In embodiments in which a polymer is used as the shell of the core/shell quantum dot, the polymer may be included as a layer of a coating on individual particles which are then dispersed in a liquid medium such as the drilling fluid. In such embodiments, the polymer may be grafted to the surface of the core particle.

In other embodiments, the polymer shell may be in a bulk form, meaning the core quantum dots may be dispersed in a bulk polymer melt. In such embodiments, the polymer may be cooled to form a polymer having the quantum dots dispersed in it. In one or more embodiments, the polymer having the dispersed quantum dots may be shaped into foils, threads and other shapes appropriate for use in drilling fluids. Bulk polymers in which quantum dots may be dispersed include but are not limited to polyethylene (PE), polypropylene (PP), polyacrylates and polymethacrylates (PMMA), epoxy resins, poly(vinylcarbazole), poly-3(hexylthiophene), polyethylene glycol (PEG), polystyrene, polyamides, polyvinylcarbazole (PVK), and poly (p-phenylene vinylene).

In one or more embodiments, inorganic core-shell quantum dots may be employed as a quantum dot that is then further coated with a polymer shell. Inorganic core/shell quantum dots are quantum dots with one material as the core, and another material that has been grown epitaxially as the shell. Any number of shell layers may be epitaxially grown to provide multiple different shell layers on the inorganic core/shell quantum dot which may then be further coated with a polymer shell.

Methods of Making Core-Shell Quantum Dots

The present disclosure also relates to methods of making the disclosed core-shell quantum dot particles. As will be appreciated by those skilled in the art, some core-shell quantum dots may be commercially available. However, in order to design core-shell quantum dots suitable for use in drilling fluid, specific core-shell quantum does may be synthesized, such as by the methods disclosed herein.

In one or more embodiments of the present disclosure, inorganic quantum dots with an inorganic ligand layer may be made by a solution synthesis method. An exemplary embodiment of making a CdSe quantum dot is as follows. Fifty grams of trioctylphosphine oxide (TOPO) may be dried and degassed in a reaction vessel by heating to 200° C. at 1 Torr for 20 minutes and flushing periodically with argon. The temperature of the reaction flask may then be stabilized at 300° C. under 1 atm of argon. Solution A may be prepared by adding 1 mL (13.35 mmol) of dimethyl cadmium ($Me_2Cd$) to 25.0 mL of trioctylphosphine (TOP) in an inert atmosphere. Solution B may be prepared by adding 10.0 mL of a 1 M TOPSe (TOP-selenide) stock solution (10.00 mmol) to 15.0 mL of TOP. Solutions A and B may be combined and loaded into a 50-mL syringe under inert atmosphere to make reagent mixture. The heat may be removed from the reaction vessel containing TOPO. The syringe containing the reagent mixture may then be injected into the vigorously stirring reaction flask in a single injection through a rubber septum. The rapid introduction of the reagent mixture produces a deep yellow/orange solution with an absorption feature at 440-460 nm. This may also be accompanied by a sudden decrease in temperature to about 180° C. Heating may be restored to the reaction flask and the temperature gradually raised to 230-260° C.

Aliquots of the reaction solution may be removed at regular intervals (5-10 min) and absorption spectra taken to monitor the growth of the crystallites. The best quality samples are prepared over a period of a few hours of steady growth by modulating the growth temperature in response to changes in the size distribution as estimated from the absorption spectra. The temperature may be lowered in response to a spreading of the size distribution and increased when growth appears to stop. When the desired absorption characteristics are observed, a portion of the growth solution may be transferred by canula and stored in a vial. In this way, a series of sizes ranging from about 15 to 115 Angstroms in diameter can be isolated from a single preparation.

The resultant quantum dots may be purified by removing 10-mL aliquot of the reaction solution and cooling it to 60° C., slightly above the melting point of TOPO. Addition of 20 mL of anhydrous methanol to the aliquot results in the reversible flocculation of the quantum dots. The flocculate may be separated from the supernatant by centrifugation. Dispersion of the flocculate in 25 mL of anhydrous 1-butanol followed by further centrifugation results in an optically clear solution of quantum dots and a gray precipitate containing byproducts of the reaction. This precipitate may be discarded. Addition of 25 mL of anhydrous methanol to the supernatant produces flocculation of the crystallites and removes excess TOP and TOPO. A final rinse of the flocculate with 50 mL of methanol and subsequent vacuum drying produces free-flowing TOP/TOPO-capped CdSe nanocrystallites. The resulting powder may be readily dispersed in a variety of alkanes, aromatics, long-chain alcohols, chlorinated solvents, and organic bases (e.g., amines, pyridines, furans, phosphines).

Quantum dots having grafted polymer on the surface may be made by incubating quantum dots in a polymer solution for a period of time and then filtering the polymer-coated quantum dots from the solution.

In order to make a bulk polymer impregnated with quantum dots, quantum dot precursors may be dispersed in a monomer solution, and polymerization along with formation of quantum dots may proceed simultaneously. In an exemplary embodiment, in situ sol-gel polymerization is demonstrated for fabricating transparent poly(methyl methacrylate) (PMMA)-ZnO quantum dot (QD)-hybrid materials in bulk. The synthesis of ZnO QD complexes may be achieved by hydrolyzing $Zn(CH_3COO)_2 \cdot 2H_2O$ (ZAD) with monoethanolamine (MEA). First, Zn(II) solution (0.01-0.1 $mol \cdot L^{-1}$) may be prepared by refluxing $Zn(CH_3COO)_2 \cdot 2H_2O$ in ethanol at 80° C. for two hours under continuous stirring. Subsequently, MEA may be added to the Zn(II) solution. Methyl methacrylate (MMA) monomer may be mixed directly with the complex Zn solution before curing. After the addition of an initiator, 2,2'-azobisisobutyronitrile (AIBN), sonication may be used to disperse the mixture. The in-situ sol-gel polymerization may be performed at 70° C. for about 12 hours while applying constant mechanical stirring. Modification of the competition between sol-gel processes and polymerization processes may allow for tuning of the size of the inorganic nanoparticles formed in-situ from the sol-gel process. For example, reducing the amount of initiator used in the polymerization process causes slowing of the overall polymerization process, resulting in larger inorganic nanoparticles in the polymer matrix. Once polymerization is complete, ethanol may be evaporated, and the bulk transparent PMMA-ZnO hybrid materials remain.

In one or more embodiments of the present disclosure, core/shell inorganic quantum dots may be made by a solution synthesis method to epitaxially grown an inorganic shell on an inorganic quantum dot core. In an exemplary embodiment, (CdSe)ZnS core-shell quantum dots may be made using the following procedure. A flask containing 5 g of trioctylphosphine oxide (TOPO) may be heated to 190° C. under vacuum for several hours and then cooled to 60° C. after which 0.5 mL of trioctylphosphine (TOP) may be added to the flask with TOPO. About 0.1-0.4 µmol (micromoles) of CdSe quantum dots dispersed in hexane may be transferred into the reaction vessel via syringe, and the solvent removed via vacuum. Diethylzinc ($ZnEt_2$) and hexamethyldisilathiane (($TMS)_2S$) were used as the Zn and S precursors, respectively. Equimolar amounts of the precursors may be dissolved in 2-4 mL of TOP inside an inert atmosphere glovebox. The precursor solution may be loaded into a syringe and transferred to an addition funnel attached to the reaction flask. The reaction flask containing CdSe dots dispersed in TOPO and TOP may be heated under an atmosphere of $N_2$. The temperature at which the precursors were added may range from 140° C. for 23 Å diameter dots to 220° C. for 55 Å diameter dots. When the desired temperature is reached, the Zn and S precursors may be added dropwise to the vigorously stirring reaction mixture over a period of 5-10 min. After the addition is complete, the mixture may be cooled to 90° C. and left stirring for several hours. A 5 mL aliquot of butanol may be added to the mixture to prevent the TOPO from solidifying upon cooling to room temperature. The overcoated particles may be stored in the solution to ensure that the surface of the dots remained passivated with TOPO.

As noted above, core-shell inorganic quantum dots may be used as the quantum dot core. In one or more embodiments, to obtain core-shell quantum dots (CSQD) epitaxial layers of inorganic material over a quantum core may be grown. The CSQDs may be prepared by using the organometallic route or by aqueous phase synthesis. High temperature thermal decomposition of organometallic compounds may be used to synthesize the core. In an exemplary embodiment of high temperature thermal decomposition, octacarbonyl dicobalt complex may be converted to cobalt metal in the presence of surfactant at about 500° C. The absorbed surfactant may be removed by washing repeatedly followed by storage in toluene and ethanol. The synthesized cobalt is highly reactive. Thus, contact with air leads to the formation of cobalt oxide shell resulting in a cobalt core-cobale oxide shell CSQD.

Composition of a Drilling Fluid Including Core-Shell Quantum Dots

The core-shell quantum dots disclosed herein may be included in a drilling fluid composition. In one or more embodiments, the drilling fluid may be an oil-based drilling fluid (i.e., an invert emulsion) or an aqueous-based drilling fluid. The core-shell quantum dots may be suitably adapted (for example by tuning the surface chemistry) to make them compatible with the desired drilling fluid.

In one or more embodiments, the drilling fluid may include a suitable amount of the quantum dots for delivering the tags downhole to the formation. The amount of quantum dots may be adjusted depending on the type of quantum dots used. In one or more embodiments, the drilling fluid may include a range of about 1.0 to 3.0 wt. % of quantum dots.

Method of Correlating Recovered Drill Cuttings to Drilling Depth

Figure 3:
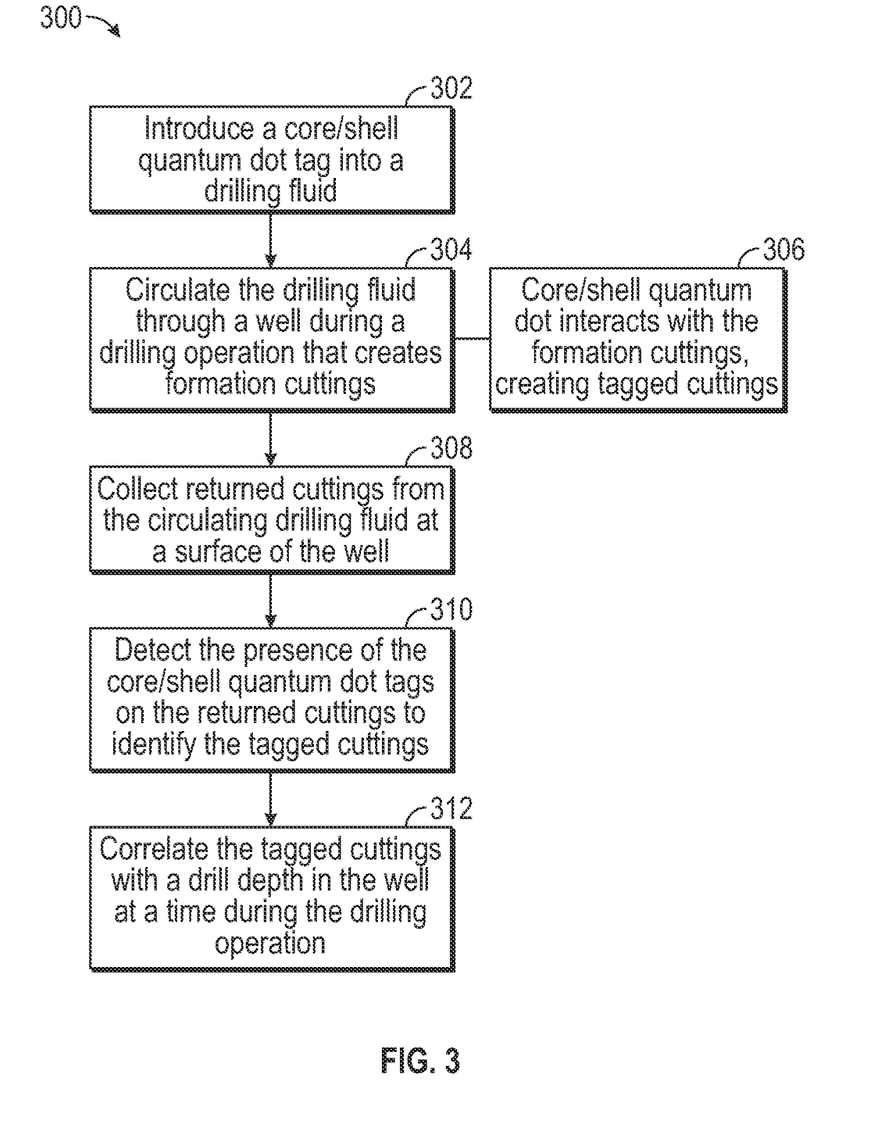
FIG. 3 shows a block flow diagram of a method in accordance with one or more embodiments of the present disclosure.

One or more embodiments of the present disclosure relate to methods of using the disclosed quantum dots to determine the drill depth of drill cuttings. An exemplary method 300 is shown in FIG. 3. The method 300 shown in FIG. 3 includes introducing a core/shell quantum dot (tag) into a drilling fluid, the core/shell quantum dot having an inorganic core and an organic shell 302. The core/shell quantum dot tags may be introduced into the drilling fluid by mixing the tags with the drilling fluid prior to pumping the drilling fluid downhole (e.g., via the tagging system 140 described with reference to FIG. 1). A tag having a particular fluorescence emission wavelength may be introduced at a known drill depth.

After the tag has been introduced into the drilling fluid, the drilling fluid is circulated through a well during a drilling operation that creates formation cuttings 304. During the process of circulating the drilling fluid as formation cuttings are created, the core/shell quantum dot interacts with the formation cuttings, creating tagged cuttings 306.

As drilling fluid is circulated in the well, cuttings, including tagged cuttings, are returned to the surface of the well in the circulating fluid. The method 300 includes collecting these returned cuttings from the circulating drilling fluid at a surface of the well 308. In some embodiments, the returned cuttings may be collected via the cuttings return and detection system 120 described with reference to FIG. 1.

Once returned drill cuttings are collected, the presence of the core/shell quantum dot tags may be detected on the returned cuttings to identify the tagged cuttings 310. In one or more embodiments, the presence of the core/shell quantum dot tags may be detected by illuminating the returned cuttings with UV light and obtaining images of the cuttings with a camera. In some embodiments, type of core/shell quantum dot may be detected via any suitable detection method, and in particular embodiments, the detection method may be selected from the group consisting of UV-visible spectroscopy, fluorimetry, and mass spectroscopy.

The method 300 then includes correlating the tagged cuttings identified from the returned cuttings with a drill depth in the well at a time during the drilling operation 312. The correlation may be made by identifying the fluorescence of the tagged cuttings and associating the fluorescent with a tag that was introduced at a given time. The time at which a particular tag was introduced may be associated with a given drill depth (e.g., based on drill pipe length, pump rate, and calculated return time).

In one or more embodiments, multiple tags may be used to determine depth of cuttings at different times during the drilling operation. In such embodiments, after the previously described steps, a second core/shell quantum dot tag may be pumped with the drilling fluid down the well. The second core/shell quantum dot tags may attach to and tag formation cuttings as the well is drilled. During the drilling operation, the drill cuttings are returned to the surface of the well as the drilling fluid is circulated, and the presence of the second core/shell quantum dot may be detected on the tagged cuttings in the same or similar manner that previous core/shell quantum dot tags were detected.

In one or more embodiments, the first core/shell quantum dot tags may have a first emission wavelength, and the second core/shell quantum dot tags may have a second emission wavelength. The first emission wavelength is different from the second emission wavelength such that the first core/shell quantum dot may be differentiated from the second core/shell quantum dot by illuminating the core/shell quantum dots with UV light and obtaining images of the cuttings with a camera. As will be appreciated by those skilled in the art, any number of different core/shell quantum dots may be used at different depths during the drilling process. The core/shell quantum dots may be chosen based on their emission wavelength such that they may be differentiated from one another using any of the aforementioned detection methods.

Embodiments of the present disclosure may provide at least one of the following advantages. The disclosed compositions and methods may allow for more precise depth determination of drill cuttings in real time during drilling operations as compared to conventional methods of analyzing drill cuttings. In one or more embodiments, analysis may be performed rapidly on-site, rather than transporting samples to a laboratory for analysis. The quantum dots disclosed herein have a tunable fluorescence excitation wavelength, high quantum yield fluorescence, broad excitation spectra and remarkable colloidal stability. Thus, the returned drill cuttings to the surface may be identified accurately based on their depth of origin due to their fluorescent marker.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A composition of matter comprising:
   a core-shell quantum dot particle having an inorganic core and an organic shell, wherein the organic shell is a polymer;
   drilling fluid; and
   formation cuttings, wherein the core-shell quantum dot particle is attached to the formation cutting,
   wherein the polymer is derived from units of at least one monomer, wherein the monomer is selected from the group consisting of styrene, aminostyrene, bromostyrene, chlorostyrene, butyl methacrylate, t-butyoxystyrene, trifluoromethyl styrene, pentafluorostyrene, ethylene glycol dimethacrylate, triethyl orthosilicate, ethylene oxide, acrylic acid, methacrylic acid, ethylene, propylene, and combinations thereof.

2. The composition of claim 1, wherein the inorganic core is a cadmium-containing chalcogenide.

3. The composition of claim 1, wherein the inorganic core is selected from the group consisting of InP, CuInS$_2$, InP/ZnSeS/ZnS, PbS, PbO, ZnO, ZnS, HgS, GaAs, GaP, AlGaAs HgTe, InAs, and graphene.

4. The composition of claim 1, wherein the inorganic core is a perovskite.

5. The composition of claim 4, wherein the perovskite is selected from the group consisting of CsPbBr$_3$, and CH$_3$NH$_3$PbBr$_3$.

6. The composition of claim 1, wherein the inorganic core includes a dopant selected from the group consisting of Mn$^{2+}$, Tm$^{3+}$, Er$^{3+}$, Tb$^{3+}$, Eu$^{3+}$, Ag$^+$, and combinations thereof.

7. The composition of claim 1, wherein the polymer is of a polymer type selected from the group consisting of polythiols, poly(ethylene glycol), thiolated poly(ethylene glycol), peptides, multidentate phosphine polymers, poly(acrylamide)s, poly(amidoamine)s, poly(ethyleneimine)s, poly(N,N-dimethylaminoethyl methacrylate)s, amphiphilic di- and tri block-co-polymers, poly(maleic acid) derivatives, poly(maleic anhydride-alt-1-tetradecene), and combinations thereof.

8. The composition of claim 1, wherein the polymer is selected from the group consisting of poly ethyleneimine, polyacrylamide, poly chlorostyrene, poly bromostyrene, and poly methylstyrene.

9. A method comprising:
   introducing a core-shell quantum dot particle having an inorganic core and a polymer shell into a drilling fluid, wherein the polymer is derived from units of at least one monomer, wherein the monomer is selected from the group consisting of styrene, aminostyrene, bromostyrene, chlorostyrene, butylmethacrylate, t-butyoxystyrene, trifluoromethyl styrene, pentafluorostyrene, ethylene glycol dimethacrylate, triethyl orthosilicate, ethylene oxide, acrylic acid, methacrylic acid, ethylene, propylene, and combinations thereof;
   circulating the drilling fluid through a well during a drilling operation that creates formation cuttings such that the core-shell quantum dot particle interacts with and attaches to the formation cuttings, creating tagged cuttings;
   collecting returned cuttings from the circulating drilling fluid at a surface of the well;
   detecting the presence of the core-shell quantum dot particle on the returned cuttings to identify the tagged cuttings; and
   correlating the tagged cuttings with a drill depth in the well at a time during the drilling operation.

10. The method of claim 9, wherein detecting the core-shell quantum dot particle comprises illuminating the tagged cuttings with UV light and obtaining images of the cuttings with a camera.

11. The method of claim 9, wherein the detecting the core-shell quantum dot particle comprises using a detection method selected from the group consisting of UV-visible spectroscopy, fluorimetry, and mass spectroscopy.

12. The method of claim 9, further comprising:
   pumping a second core-shell quantum dot particle with the drilling fluid down the well after circulating the core-shell quantum dot particle, wherein the second core-shell quantum dot particle is configured to attach to and tag formation cuttings as the well is drilled;
   returning the drilling fluid and tagged formation cuttings from the well; and
   detecting the presence of the second core-shell quantum dot particle on the tagged cuttings.

13. The method of claim 12, wherein the core-shell quantum dot particle comprises a first emission wavelength, wherein the second core-shell quantum dot particle comprises a second emission wavelength, and wherein the first emission wavelength is different from the second emission wavelength such that the core-shell quantum dot particle may be differentiated from the second core-shell quantum dot particle by illuminating the core-shell quantum dot particles with UV light and obtaining images of the tagged cuttings with a camera.

* * * * *